(12) United States Patent
Keeling et al.

(10) Patent No.: US 9,421,487 B2
(45) Date of Patent: Aug. 23, 2016

(54) GAS FILTRATION SYSTEM

(71) Applicant: CAMBRIDGE INTERNATIONAL INC., Cambridge, MD (US)

(72) Inventors: Maxwell Lawrence Keeling, Cambridge, MD (US); Matthew Charles O'Connell, Cambridge, MD (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 6 days.

(21) Appl. No.: 14/218,227

(22) Filed: Mar. 18, 2014

(65) Prior Publication Data

US 2014/0260983 A1  Sep. 18, 2014

Related U.S. Application Data

(60) Provisional application No. 61/800,581, filed on Mar. 15, 2013.

(51) Int. Cl.
*B01D 46/22* (2006.01)
*B01D 46/00* (2006.01)

(52) U.S. Cl.
CPC ............ *B01D 46/22* (2013.01); *B01D 46/0065* (2013.01)

(58) Field of Classification Search
CPC .......... D06F 58/20; D06F 58/22; Y10S 55/10
USPC ........... 34/79, 82; 55/354, 466, DIG. 10, 351, 55/352, 353; 210/104, 398

See application file for complete search history.

(56) References Cited

U.S. PATENT DOCUMENTS

| | | | | |
|---|---|---|---|---|
| 2,925,664 | A | * | 2/1960 | Cobb et al. ......................... 34/79 |
| 3,596,442 | A | * | 8/1971 | Neumann .............. B01D 46/02 D46/2 |
| 3,717,978 | A | * | 2/1973 | Osborne, Jr. ........... B01D 46/18 D46/18 |
| 4,865,724 | A | * | 9/1989 | Brandt et al. .................. 210/104 |
| 5,320,753 | A | * | 6/1994 | Keillor et al. .................. 210/398 |
| 6,402,822 | B1 | * | 6/2002 | Najm ................. B01D 46/0086 D46/86 |
| 6,632,269 | B1 | * | 10/2003 | Najm ................. B01D 46/0023 D46/23 |
| 8,048,205 | B2 | * | 11/2011 | Schaub ................... D06F 58/22 34/115 |
| 8,404,030 | B2 | * | 3/2013 | Schumacher ........ B01D 46/185 D46/185 |

* cited by examiner

*Primary Examiner* — Duane Smith
*Assistant Examiner* — Minh-Chau Pham
(74) *Attorney, Agent, or Firm* — Buchanan, Ingersoll & Rooney PC

(57) ABSTRACT

A filtration system for removing a particulate material includes a housing having an air stream flow path communicating between an inlet for incoming polluted air containing particulate material and an air outlet for emitting clean air filtered by removing the particulate material; a filter media collection system provided in the air stream to collect the particulate material, the collection system including at least one spool of filter media; and a filter media cleaning system provided to clean the collected particulate material from the filter media.

6 Claims, 5 Drawing Sheets

GAS FILTRATION SYSTEM

TECHNICAL FIELD

The present invention relates to a gas filtration system, and more particularly to a standalone gas filtration system having a moving filter media to remove particulate material from an air stream.

BACKGROUND

Conventionally, before emitting so-called "industrial waste gases" and/or "process gases", air purification is performed to remove various types of fine particulates contained in the industrial waste gases, such as mist and dust containing sticky and abrasive particulate powders, which pollute the atmosphere, and/or process gases containing similar particulate which could damage process equipment used in the coatings, paint and encapsulation industries, for example.

Previous air stream filtration methods include, for example, cyclone separator systems, hepafilter systems and bag houses, each of which has suffered from certain drawbacks and inefficiencies. In cyclone separators, for instance, the particulate laden gas is introduced under pressure, and thus vessel pressure and "collapsing pressure" due to pressure loss through the cyclone system are a common cause of concern.

It is an object of the disclosure herein to provide a gas filtration system with improved reliability and efficiency, and in particular, a standalone gas filtration system capable of filtering air streams.

SUMMARY

These and other objects of the disclosure herein are provided by. A filtration system for removing a particulate material, comprising a housing having an internally defined air path communicating between an inlet for incoming polluted air containing particulate material and an air outlet for emitting clean air filtered by removing the particulate material; a filter media collection system provided in the air stream to collect the particulate material, said collection system including at least one spool of filter media; and a filter media cleaning system provided to clean the collected particulate material from the filter media.

BRIEF DESCRIPTION OF THE DRAWING FIGURES

These and other objects, features, and advantages of the disclosure will become more readily apparent to those skilled in the art upon reading the following detailed description, in conjunction with the appended drawings in which.

DETAILED DESCRIPTION

Figure 1:
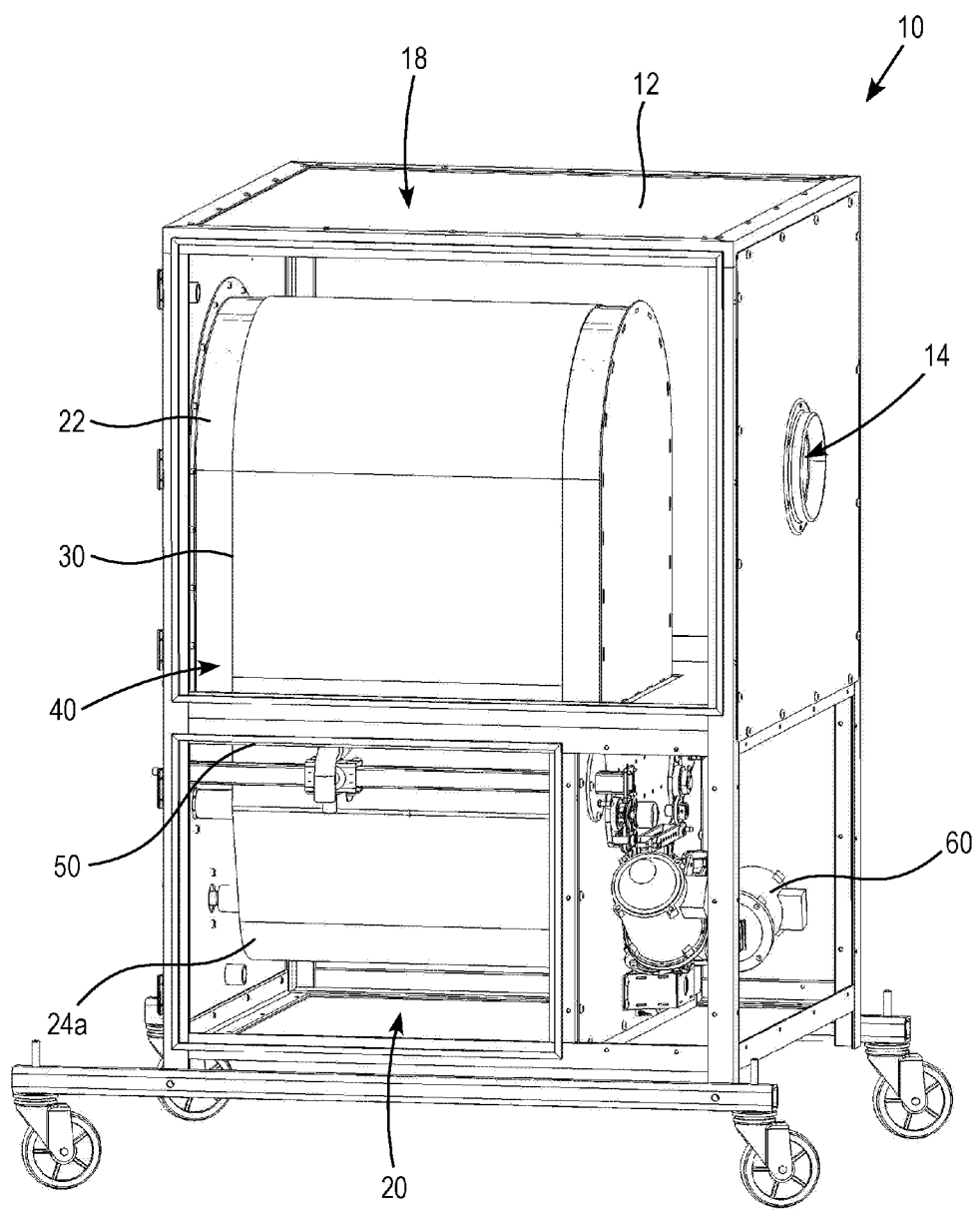
FIG. 1 is a perspective view of a gas filtration system according to a first exemplary embodiment of the disclosure.
Figure 2:
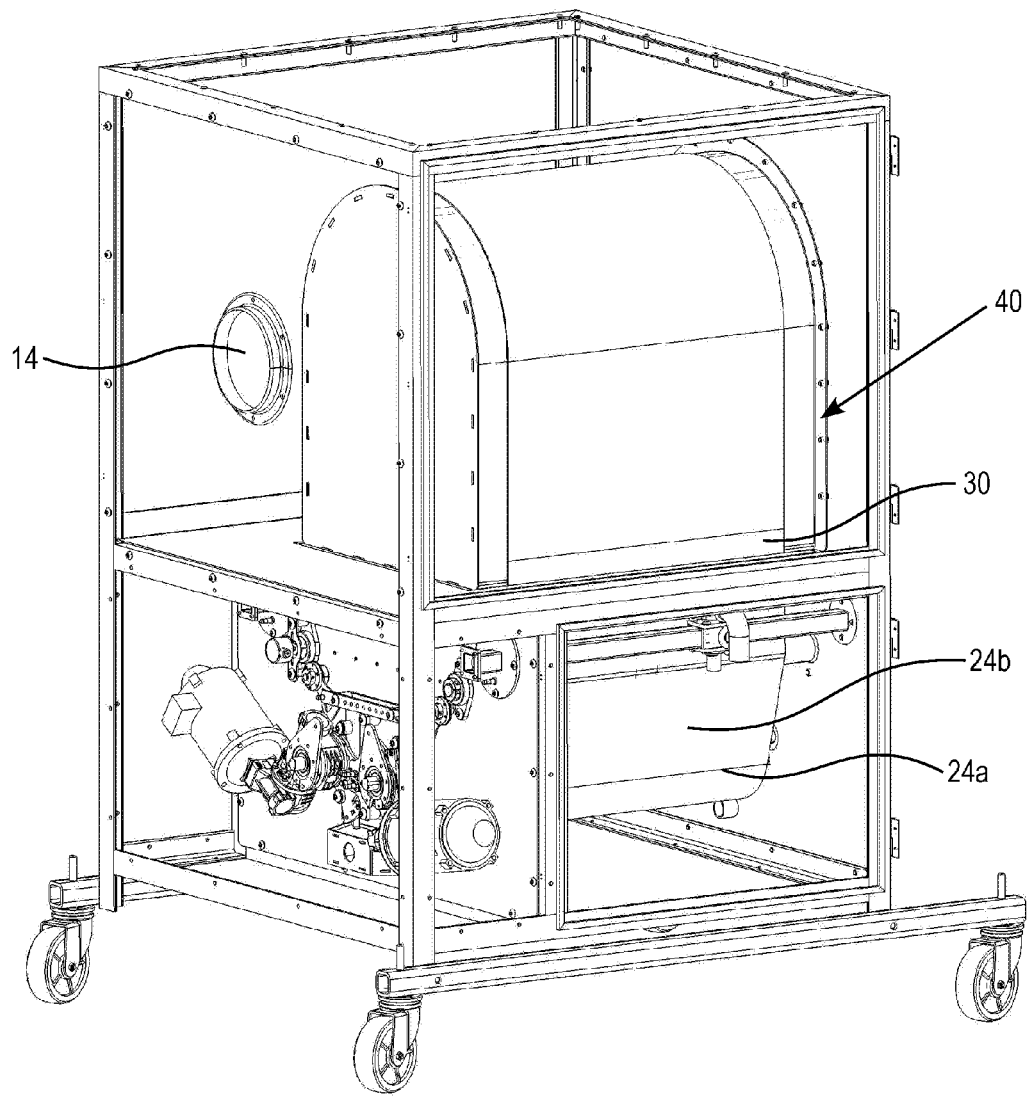
FIG. 2 is a further perspective view of the filtration system shown in FIG. 1.
Figure 3:
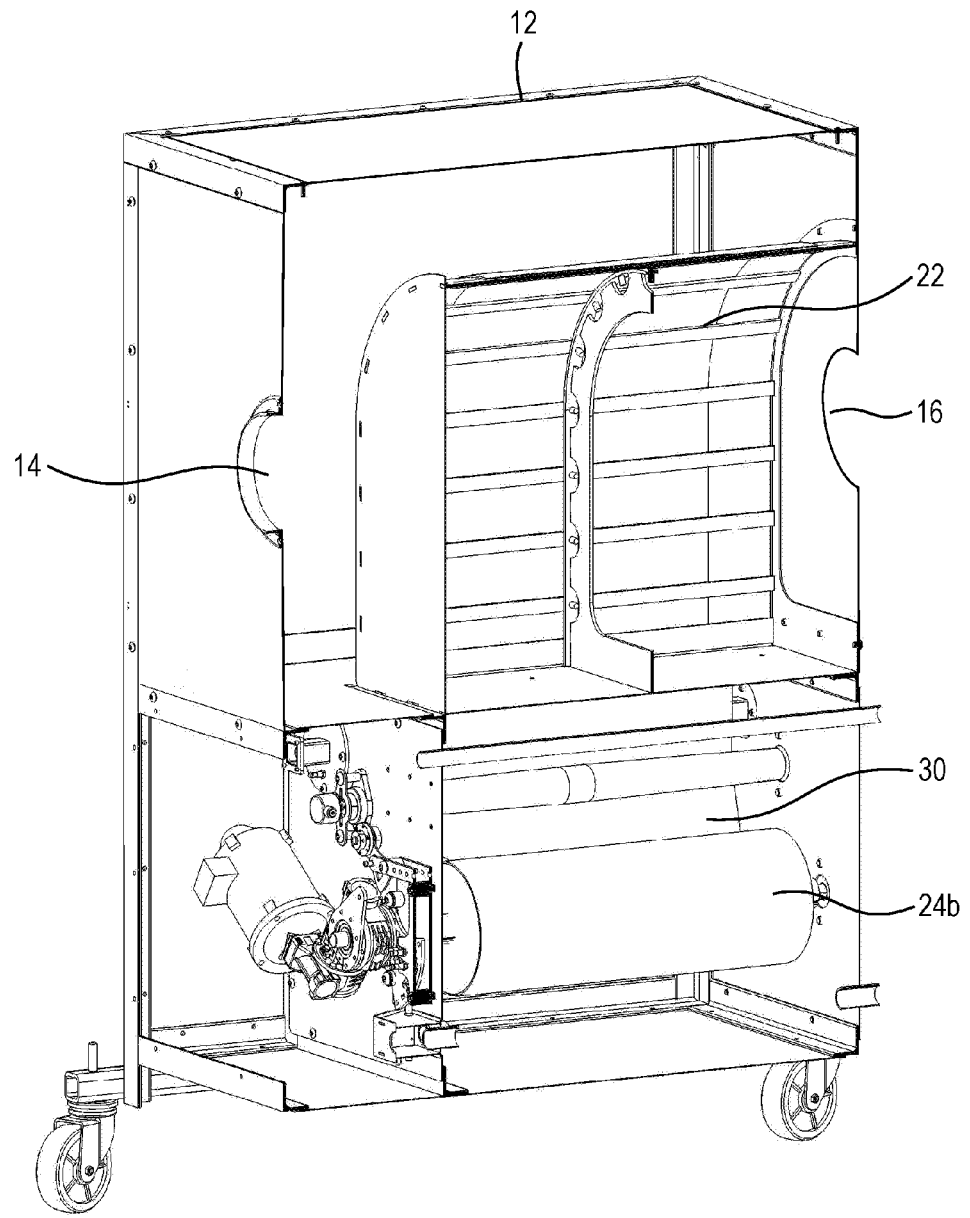
FIG. 3 is a cut-away side view of the filtration system shown in FIG. 1.
Figure 4:
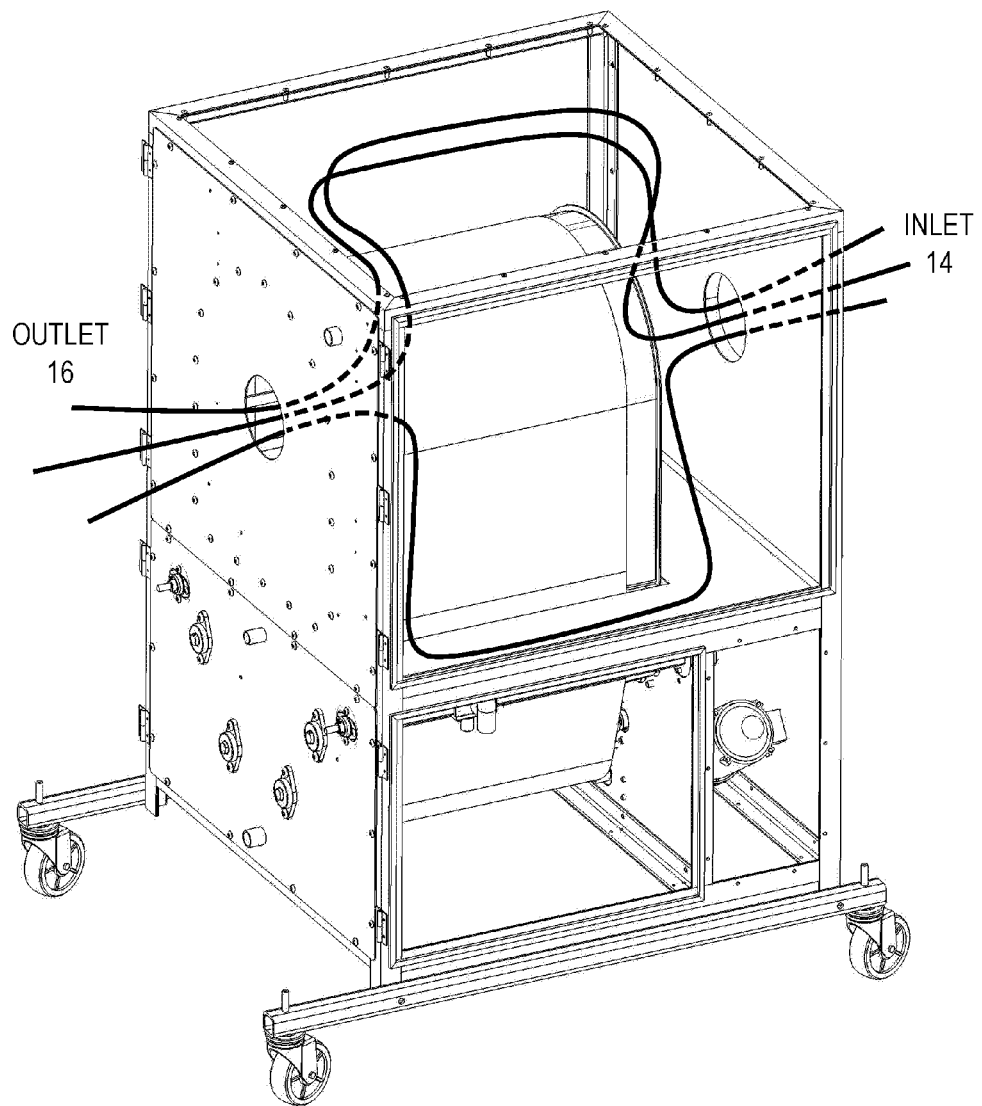
FIG. 4 is a perspective view of the gas filtration system shown in FIG. 1, illustrating the gas flow path.
Figure 5:
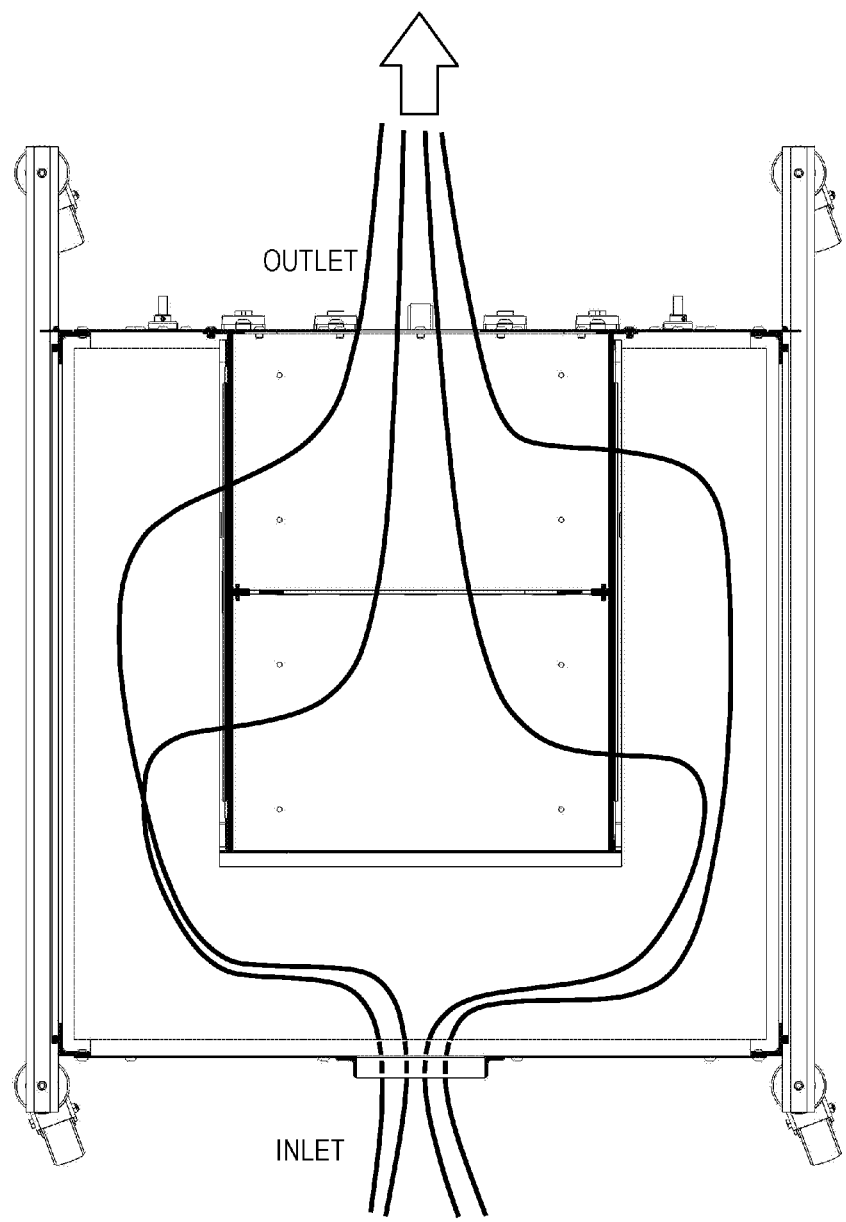
FIG. 5 is cut-away top view of the collection system shown in FIG. 4, illustrating the gas flow path.

A filtration system 10 in accordance with a first exemplary embodiment of the disclosure is shown best in FIGS. 1-3. The filtration system 10 is a standalone gas filtration system designed to capture particulate from a gas stream. It is designed and best suited for use in the small to mid-sized cogeneration market as well as process filtration markets such as mining, pharmaceuticals and engineered wood products. In these markets simplicity, compactness, cost effectiveness and a high particulate removal rate are highly valued. As used herein, the terms "gas" and "air" are understood by one skilled in the art to define the same fluid.

Filtration system 10 is confined within a housing 12 having an air inlet 14 and an air outlet 16. Housing 12 defines an internally formed air path communicating between inlet 14 for incoming polluted air containing particulate material and outlet 16 for emitting clean air filtered by removing the particulate material. Housing 12 preferably includes two interior sections, a treatment area section 18 and a cleaning area 20, which are sealed to the gas flow. Filtration system 10 further includes a filter media collection system 40 which collects the particulate from the air stream, a filter media cleaning system 50 to remove the particulate adhered to the filter media collection system 40, and a drive system 60 for actuating and controlling the systems of the filtration system 10.

Filter media collection system 40 preferably includes a static drum 22 and an active filter media 30 which is moved over the surface of the drum 22 by a drive system 60, as explained further below. As shown in the exemplary embodiment of FIGS. 1-5, the drum 22 is a static, perforated, or otherwise partially open drum, disposed within the treatment area section 18 of the housing 12. Moreover, the drum 22 is constructed in such a way that gas entering the housing 12 through air inlet 14 may only pass into the drum 22 by way of the perforations 32 or holes in its surface, and the gas may only exit the housing 12 by way of the outlet 16.

Within the cleaning area 20 are at least one and preferably two filter media spools 24a, 24b and a filter media cleaning system 50. The drive system 60 disposed exterior to the gas flow, i.e., outside of the treatment area 18 and the cleaning area 20, causes rotation of at least one filter media spool 24a, 24b within the cleaning area 20, which in turn causes the filter media 30 to be moved across the surface of the drum 22 by means of tension created by the spools 24a, 24b. In a preferred embodiment, and by way of example, filter media spool 24b will be driven in a clockwise direction such that the filter media 30 spools up on filter media spool 24b and the opposite spool 24a is depleted. When filter media spool 24a is nearly empty, drive system 60 reverses direction to spool the other way. That is, filter media spool 24a will be driven in a counter-clockwise direction such that the filter media 30 spools up on spool 24a and the opposite spool 24b is now depleted. This motion operates continuously, changing direction to move the filter media 30 back and forth between opposing spools 24a, 24b.

As the filter media 30 exits the treatment area 18 and enters the cleaning area 20, the filter media cleaning system 50 operates to clean the filter media 30. The filter media cleaning system 50 may include a vacuum, blower, active or passive brush, beater bar, chemical treatment bath or spray, or other method of removing, collecting, or destroying accumulated material on the filter media 30.

The filtration system 10 operates in the following manner: the air stream enters the housing 12 within the treatment area section 18 and passes through the filter media collection system 40. That is, the active rotating filter media spool 24a, 24b causes the filter media 30 to move over drum 22 and, as the air stream passes through the drum 22 in the direction of air flow path "P", particulate impacts and adheres to the surfaces of the moving filter media 30. As the filter media 30 exits the treatment area 18 and enters the cleaning area 20, the filter media cleaning system 50 operates to clean the filter media 30. When active filter media spool 24a, 24b is nearly empty, drive system 60 reverses direction to spool the other way and the other filter media spool then becomes the active rotating filter media spool.

According to a further exemplary embodiment disclosed here, the filtration system 10' includes a wire belt support structure rather than a drum, and a wire support belt is driven over its surface to provide a support surface for the filter media. An advantage of filtration system 10' using the support belt system is that it reduces the tension required to move the filter media, and thus filter media too weak for conventional systems may be used.

The filtration system 10 is advantageous because the spooling action of the filter media 30 allows a larger quantity of filter material to be installed in the filtration system 10 at one time. This distributes the wear or other deterioration over more material, which allows the unit to operate for longer before filter media change out is required. In addition, the filter media 30 is used in a very simple spool form, and requires less fabrication compared with filter bags or drums of convention filtration systems.

Unlike conventional drum filters, the filtration system 10 can minimize the effect of holes (or other damage) in the filter media 30. If provisions are made to measure pressure drop, or decrease in collection efficiency, either of which may be caused by a hole, the filtration system 10 can easily and quickly cycle the filter media 30 forward onto the active spool to thereby move the damaged section of filter material out of the airstream.

Further, because the filter media 30 is cleaned external to the treatment area 18, i.e., in the cleaning area 20, the filter media 30 is isolated from the air stream and thus many different filter media cleaning methods can be used, and many different types of filter media can also be used. Examples of acceptable filter media include, but are not limited to, wire clothes, felts, filter cloths, permeable fabrics, and the like.

The unique spooling action and self-cleaning abilities of the filter media collection system 40 and cleaning system 50 in filtration system 10, 10' thereby allow it to operate continuously and effectively in particulate laden air streams.

Although certain preferred embodiments of the disclosure herein have been shown and described in detail, it should be understood that various changes and modifications may be made therein without departing from the scope of the appended claims.

What is claimed is:

1. A filtration system for removing a particulate material from an air stream, comprising:
    a housing having an internally formed air path communicating between an inlet for incoming polluted air containing particulate material and an air outlet for emitting clean air filtered by removing the particulate material;
    a filter media collection system provided in the air stream to collect the particulate material, said collection system including at least one spool of filter media;
    a filter media cleaning system provided to clean the collected particulate material from the filter media; and
    a drive system for actuating and controlling the filter media collection system;
    wherein the filter media collection system includes a drum and a filter media moved over a surface of the drum by the drive system;
    wherein the filter media includes a first filter media spool and a second filter media spool, the filter media being spooled between the first and the second filter media spools;
    wherein the drive system causes rotation of at least one of the first and second filter media spools to move the filter media over the drum in a first direction and the drive system causes rotation of the other of the first and second filter media spools in an opposing direction to move the filter media over the drum in a second direction.

2. The filtration system according to claim 1, wherein the drum includes a static, perforated drum.

3. The filtration system according to claim 1, wherein the filter media cleaning system comprises means for removing accumulated material on the filter media.

4. The filtration system according to claim 3, wherein the filter media cleaning system comprises a vacuum.

5. The filtration system according to claim 3, wherein the filter media cleaning system comprises a brush.

6. A filtration method for removing a particulate material from an air stream, comprising:
    passing an air stream through an inlet to a housing having an internally formed air path communication between the inlet and an air outlet;
    providing a filter media collection system in the air stream and collecting particulate material in the air stream, the collection system including a drum and at least one spool of a filter media; and
    providing a filter media cleaning system and cleaning the collected particulate material from the filter media;
    wherein said collecting step comprises moving the filter media over a surface of the drum in a first direction;
    wherein the at least one spool of filter media includes a first filter media spool and a second filter media spool, and moving the filter media over the surface of the drum includes the filter media being spooled between the first and the second filter media spools; and further comprising:
    rotating at least one of the first and second filter media spools in a clockwise direction, the filter media moving in a first direction to spool onto the at least one of the first and second filter media spools; and
    rotating an other of the at least one first and second filter media spools in a counter-clockwise direction, the filter media moving in a second direction to spool onto the other of the at least one first and second filter media spools.

* * * * *